United States Patent [19]

Fluder et al.

[11] Patent Number: 5,283,049
[45] Date of Patent: Feb. 1, 1994

[54] MINIMIZING COKING PROBLEMS IN TUBULAR PROCESS FURNACES

[75] Inventors: Joseph H. Fluder; Richard A. Benson, both of League City, Tex.; Julio A. Peguero, Lake Charles, La.

[73] Assignee: Quantum Chemical Corporation, Cincinnati, Ohio

[21] Appl. No.: 900,880

[22] Filed: Jun. 18, 1992

[51] Int. Cl.⁵ .............................. F28D 7/00
[52] U.S. Cl. ........................... 422/198; 110/230; 110/231; 165/95; 422/197; 422/201
[58] Field of Search .............. 422/197, 198, 201; 165/95; 15/104.061; 110/230, 231; 122/332, 333; 373/22, 24, 29, 18, 117

[56] References Cited

U.S. PATENT DOCUMENTS

| | | | |
|---|---|---|---|
| 2,289,351 | 7/1942 | Dixon et al. | 165/95 |
| 4,225,362 | 9/1980 | Sentell | 165/95 |
| 4,324,649 | 4/1982 | Parizot et al. | 422/197 |

Primary Examiner—Robert J. Warden
Assistant Examiner—Krisanne M. Thornton
Attorney, Agent, or Firm—Kenneth D. Tremain; William A. Heidrich

[57] ABSTRACT

A closed tube extension or deadleg is included below the vertical tube of a hydrocarbon pyrolysis furnace. The deadleg passively collects spall coke particles to avoid plugging of the tube or its hydrocarbon inlet. Inspection or cleaning devices can be inserted through the deadleg into the tube and blocked tubes can be cleared. Pressurized steam and/or air can be injected through the deadleg to accelerate decoking of individual tubes.

15 Claims, 3 Drawing Sheets

# 5,283,049

MINIMIZING COKING PROBLEMS IN TUBULAR PROCESS FURNACES

BACKGROUND OF THE INVENTION

1. Field of the Invention

This invention relates to tubular furnaces for indirectly heating hydrocarbons. More particularly, the invention concerns improvements in both the furnace apparatus and in methods of furnace operation which can minimize problems caused by coking in the tubes and can facilitate decoking procedures.

2. Discussion of the Art

Pyrolysis of hydrocarbons, such as cracking of naphtha, gas oils, or $C_2$–$C_4$ alkanes to produce ethylene and propylene, is commonly accomplished in vertical tube furnaces. An example is found in U.S. Pat. No. 4,479,869 to Petterson et al., which concerns a pyrolysis process capable of using a range of hydrocarbon feedstocks.

The vertical tube furnace described in U.S. Pat. No. 4,412,975 to Parizot et al. and its divisional U.S. Pat. No. 4,324,649 is similar to those being commercially used to crack hydrocarbon feedstocks to ethylene. However, this design has the disadvantage that the furnace tubes cannot be inspected or cleaned without complete shutdown and isolation of the furnace to allow vessel entry.

Cracking of light hydrocarbon feeds such as ethane, propane, butane, or mixtures thereof requires hotter furnace temperatures, for example at over 1150° C. [over 2000° F.] in the upper furnace region as described in Petterson '869, compared to temperatures for naphtha feedstock. Coke laydown in the furnace tubes becomes a more serious problem at severe conditions, impeding the process flow. Coke particles can also fall within the tube, obstructing the tube itself or the feed inlet. If the tube or inlet becomes completely blocked, normal decoking operations are ineffective and the furnace must be shut down.

SUMMARY OF THE INVENTION

The invention concerns an apparatus and methods for operating that apparatus. In one aspect the invention concerns a furnace for pyrolysis of hydrocarbons comprising a furnace floor, furnace walls, and a heating chamber defined by the furnace floor and walls. One or more heat exchanging tubes extend vertically within the heating chamber. Hydrocarbons are introduced to the tube by an inlet means on the tube, proximate the floor. A closed tube extension, or deadleg, is added directly beneath the tube and below the inlet means which is capable of collecting spall coke particles. The deadleg optionally has a valve and steam fitting to aid in decoking operations.

The pyrolysis furnace operation is improved by providing the deadleg, in which at least some of the coke formed in the tube can collect without blocking the tube or the hydrocarbon inlet. The decoking sequence is also improved. The lower portion of the deadleg can be removed and coke particles extracted. Additionally, inspection or cleaning devices can be inserted through the deadleg into the tube and blocked tubes can be cleared. Pressurized steam and/or air can be injected through the deadleg to accelerate decoking of individual tubes.

DESCRIPTION OF THE PREFERRED EMBODIMENTS

Figure 1:
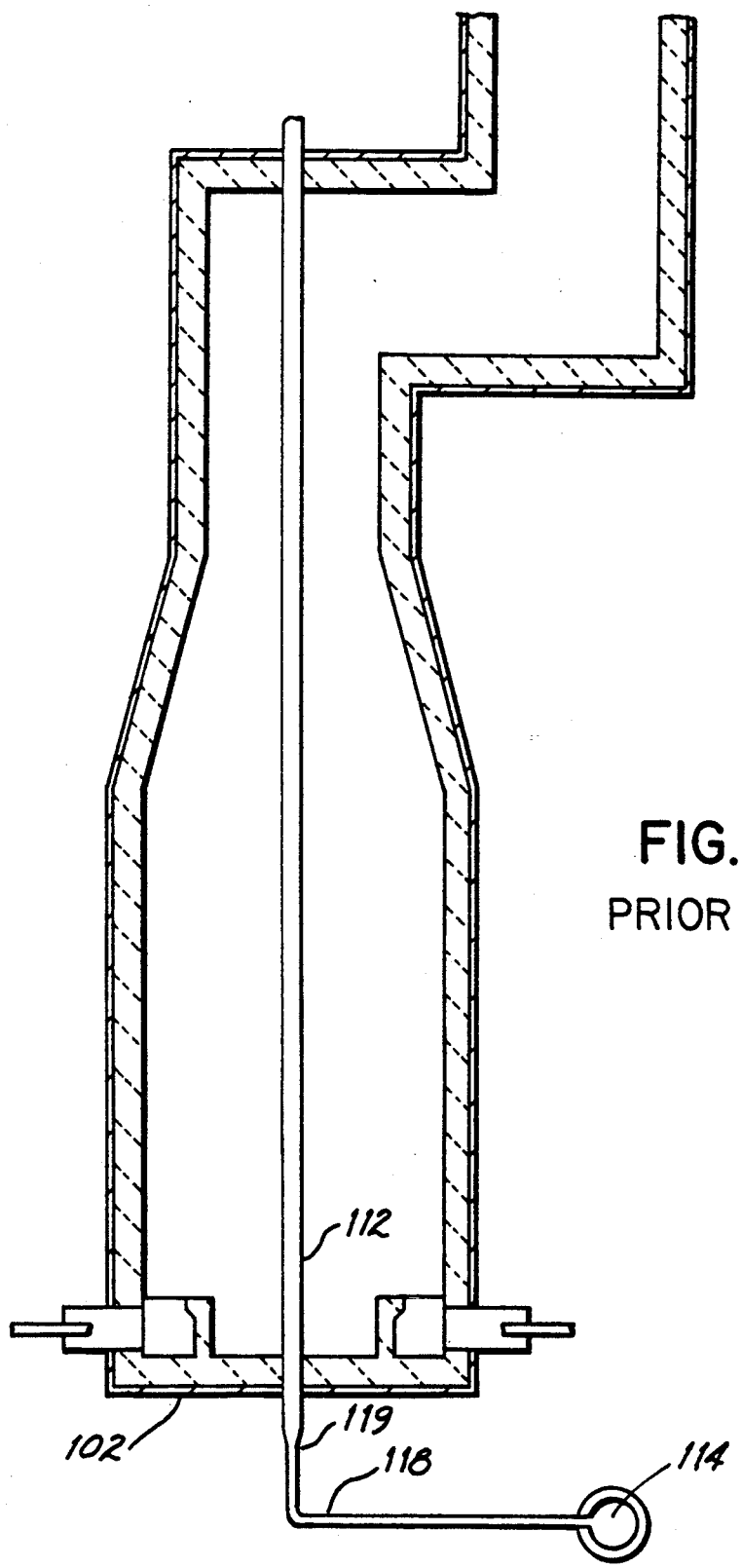
FIG. 1 is a cross-sectional view of a prior art furnace showing one vertical heat exchanger tube with hydrocarbons fed from an inlet connecting below the furnace floor.
Figure 1A:
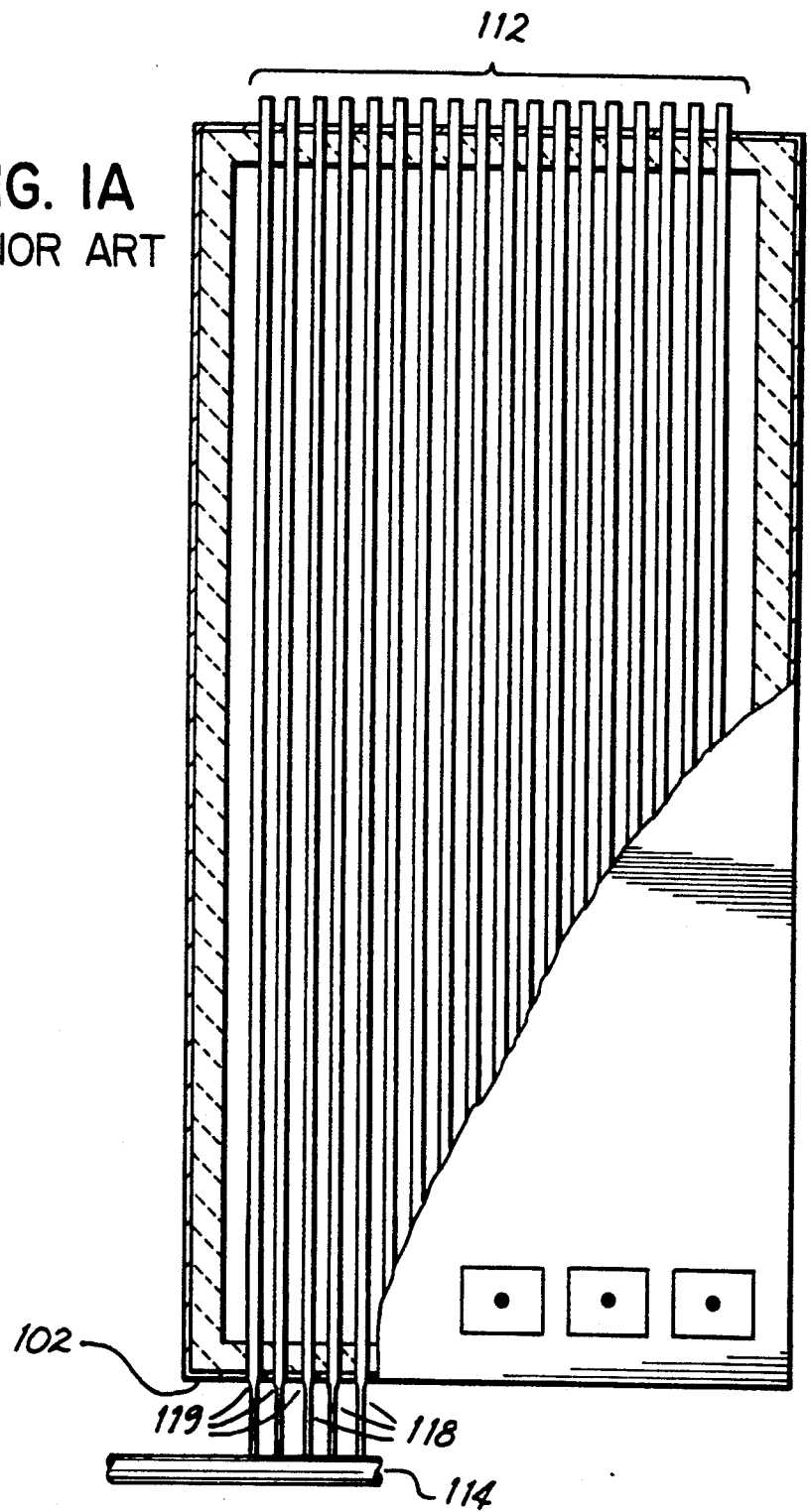
FIG. 1A is a side view of FIG. 1 showing the prior art furnace with an array of tubes.

The invention is best understood by first considering prior art FIGS. 1 and 1A which represent a furnace of the type described in U.S. 4,412,975 to Parizot et al.

A hydrocarbon feedstock is introduced to the lower end of tube 112 below furnace floor 102 via tube inlet 119 which, in turn, is fed from inlet manifold 114 through inlet pigtail 118. Although pigtails were omitted in the Parizot '975 drawings, FIG. 1 now illustrates the placement of inlet pigtail 118, which is about half the diameter of furnace tube 112. Connection 119 of pigtail 118 to the bottom of tube 112 is contained within a refractory-lined enclosure known as a pigtail box (not shown). In operation, loose coke particles tend to collect at the bottom of tube 112 or within the inlet or pigtail, restricting hydrocarbon flow.

FIG. 1A is a side view of FIG. 1 showing the prior art furnace and illustrating an array of tubes 112 fed from pigtail inlets 118 connected to inlet manifold 114.

Figure 2:
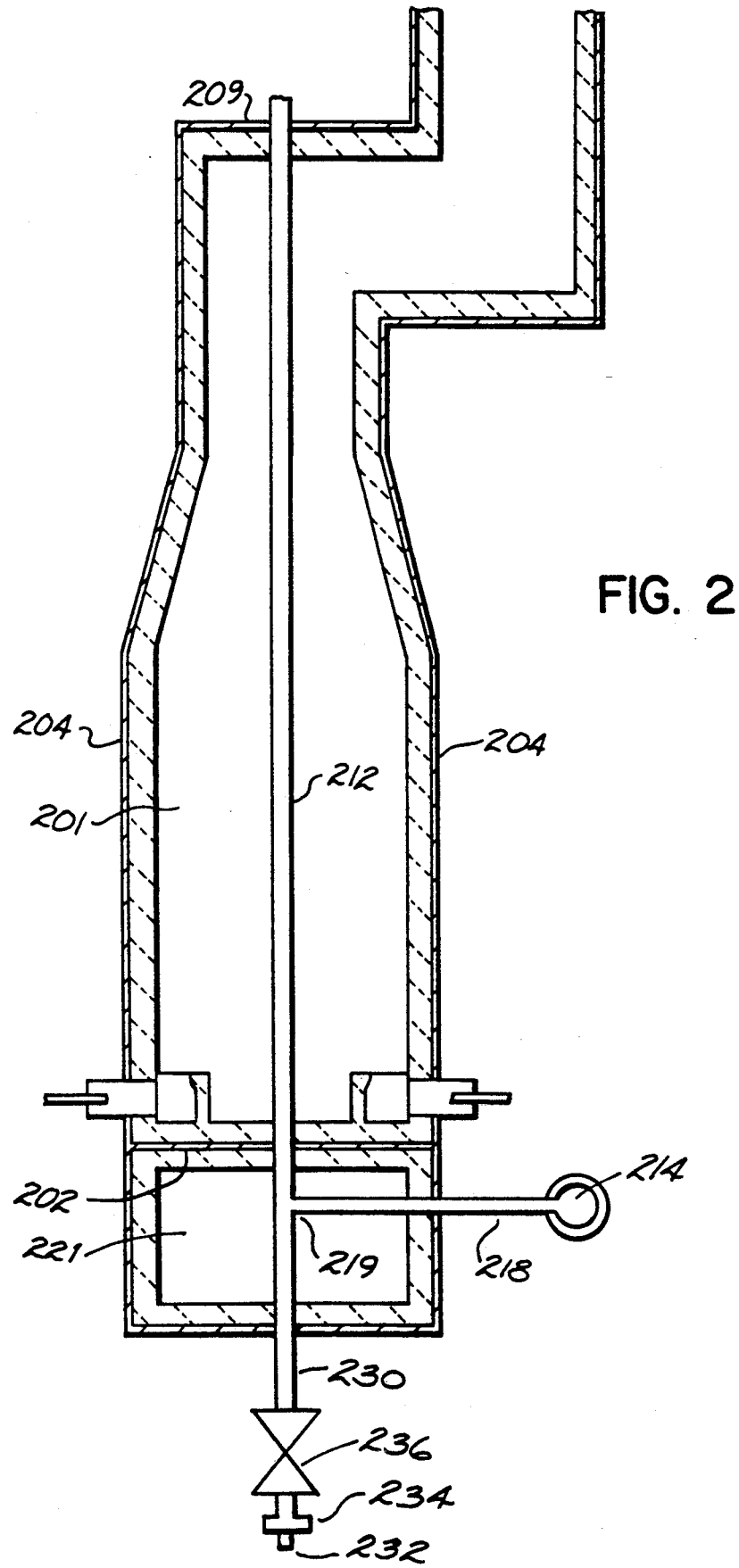
FIG. 2 is the invention in cross-section. The furnace is shown with a furnace tube, a hydrocarbon inlet connection, and a deadleg extending below the tube.

Turning now to the invention, FIG. 2 shows in cross-section a pyrolysis furnace having floor 202 and walls 204 which define heating chamber 201. Passing vertically through the heating chamber is a plurality of straight heat exchanging tubes, represented with a single tube 212 exiting through roof 209.

Hydrocarbons are introduced to tube 212 via inlet manifold 214, passing through inlet 218 which connects to tube 212 at inlet point 219. The hydrocarbons within tube 212 are subjected to extreme temperatures in chamber 201, which over time ordinarily result in at least some laydown of coke within the tube. Directly beneath tube 212, deadleg 230 extends down vertically from inlet point 219, providing an area to collect coke particles which may fall from within tube 212.

As in the prior art, connection 219 of inlet 218 to tube 212 may be contained within pigtail box 221. Deadleg 230 must extend sufficiently below inlet point 219 so that spalled coke particles will not block the flow of hydrocarbons into tube 212. Preferably, the deadleg also extends so that endpiece 234 will be exposed for access during maintenance operations, here shown extending through and below pigtail box 221.

The endpiece can be a plug or cap which can be removed during furnace shutdown to withdraw coke which may have collected in the deadleg. Inspection or cleaning of tube 212 can also be accomplished by access through the deadleg.

In a preferred embodiment, gate valve 236 or other suitable valve is included in the deadleg between the inlet point and the endpiece. Endpiece 234 can also contain fitting 232 for attachment of an air or steam hose.

To begin normal decoking of the furnace, the hydrocarbon feed to the inlet manifold is blocked off and a mixture of steam and air is fed to the tubes. Initially the mixture contains a low proportion of air, with the amount increasing gradually to minimize overheating of the tubes from combustion of the coke.

The decoking of heavily coked individual tubes can be accelerated by injecting steam or a mixture of steam and air through the deadleg into the tube. In a preferred embodiment, a steam hose is connected to fitting 232 at the end of deadleg 230. Steam at a pressure greater than the decoking process pressure (e.g., at 90 psi) flows through the deadleg to promote more efficient decoking of the tube directly above it.

Mechanical cleaning or inspection of a tube is also facilitated by this invention. Accumulated loose coke particles can be removed by opening the end of the deadleg. During furnace shutdown, inspection devices (e.g., Hall effect sensors, radiation sources, video lenses) can be inserted into the tube through the deadleg. Rods or other cleaning devices can be inserted. Blocked tubes have been successfully cleaned by cutting deadleg 230 just above valve 236, inserting a water jet (also known as a hydrojet or hydroblaster) to clean the tube, and then reattaching the valve by welding.

The preferred embodiment of the furnace is presented here, but the invention is readily applicable to other designs. The shape of heating chamber 201, particularly with respect to the walls and roof, is not critical to the invention. The inlet to the tubes can be above, but is preferably below, the furnace floor. The inside diameter of tube 212, as suggested by Parizot '975, is conventionally from 1.8 to about 5.1 cm. The diameter of the deadleg can vary, but is preferably at least as wide as the furnace tube.

In a newly designed furnace, tube 212 and deadleg 232 can be formed from a single tube. In an alternate design or in a furnace retrofit, a deadleg can be attached by welding a tubular metal extension to an existing furnace tube.

Although a preferred embodiment has been shown, it will be appreciated that modifications to the design and variations in the process may be made without departing from the scope of the invention, which is limited only by the following claims.

We claim:

1. A furnace for pyrolysis of hydrocarbons, comprising:
   (a) a furnace floor, furnace walls, and a heating chamber defined by the furnace floor and walls,
   (b) a heat exchanging tube which extends vertically within the heating chamber,
   (c) an inlet means on the heat exchanging tube, proximate the furnace floor, for introducing hydrocarbons to the heat exchanging tube, and
   (d) deadleg fluidly connected to and extending directly beneath the heat exchanging tube and below the inlet means.

2. The furnace of claim 1 in which the hydrocarbon inlet means is situated below the furnace floor.

3. The furnace of claim 1 further comprising a valve, located in the dealeg and below the inlet means.

4. The furnace of claim 3 further comprising, at a location on the deadleg and below the valve, a fitting means for injection of a fluid.

5. The furnace of claim 3 further comprising, at a location on the deadleg and below the valve, a fitting means for injection of pressurized steam.

6. A process for facilitating the operation of and removal of coke from a hydrocarbon pyrolysis furnace, the process comprising:
   providing a furnace having a furnace floor, furnace walls, a heating chamber defined by the furnace floor and walls, and at least one vertical heat exchanger tube which extends vertically within the heating chamber, which heat exchanger tube has an inlet means situated proximate the floor of the furnace,
   providing a deadleg fluidly connected to and extending directly beneath the heat exchanger tube and below the inlet means which is capable of containing at least some of the coke formed in the heat exchanger tube,
   introducing hydrocarbons to the heat exchanger tube via the inlet means, and
   heating the hydrocarbons at a temperature sufficient to cause formation of coke within the heat exchanger tube.

7. The process of claim 6 additionally comprising removing a portion of the deadleg and extracting coke from the deadleg.

8. The process of claim 6 additionally comprising removing a portion of the deadleg and inserting an object through the deadleg into the tube.

9. The process of claim 6 additionally comprising removing a portion of the deadleg and inserting a water jet through the deadleg into the tube.

10. The process of claim 6 additionally comprising removing a portion of the deadleg and inserting an inspection device through the deadleg into the tube.

11. The process of claim 6 additionally comprising injecting, through the deadleg into the heat exchanger tube, a fluid selected from the group consisting of steam, air, and mixtures thereof.

12. The process of claim 11 in which the fluid is steam.

13. The process of claim 11 in which the fluid is air.

14. The process of claim 11 in which the step of injecting the fluid through the deadleg further comprises providing a fluid injection fitting attached to the deadleg.

15. The process of claim 14 further comprising providing a valve which separates the fitting from the deadleg.

* * * * *